US010324589B2

United States Patent
Bauchot et al.

(10) Patent No.: US 10,324,589 B2
(45) Date of Patent: Jun. 18, 2019

(54) NAVIGATION BY USAGE LOCATIONS IN A DOCUMENT EDITING APPLICATION

(71) Applicant: International Business Machines Corporation, Armonk, NY (US)

(72) Inventors: Frederic J. Bauchot, Saint-Jeannet (FR); Georges-Henri Moll, Villeneuve-Loubet (FR)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/333,679

(22) Filed: Oct. 25, 2016

(65) Prior Publication Data

US 2018/0113576 A1 Apr. 26, 2018

(51) Int. Cl.
*G06F 17/00* (2019.01)
*G06F 3/0482* (2013.01)
*G06F 17/24* (2006.01)
*G06F 17/21* (2006.01)

(52) U.S. Cl.
CPC ............ *G06F 3/0482* (2013.01); *G06F 17/24* (2013.01); *G06F 17/212* (2013.01)

(58) Field of Classification Search
CPC ...... G06F 17/212; G06F 17/24; G06F 3/0482; H04L 67/22
See application file for complete search history.

(56) References Cited

U.S. PATENT DOCUMENTS

| | | | | |
|---|---|---|---|---|
| 6,182,067 B1* | 1/2001 | Presnell | ............ | G06F 17/30702 707/749 |
| 6,393,427 B1* | 5/2002 | Vu | .................... | G06F 17/30873 707/797 |
| 7,013,309 B2 | 3/2006 | Chakraborty et al. | | |
| 7,386,569 B2* | 6/2008 | Berstis | ............. | G06F 17/30011 |
| 7,739,622 B2 | 6/2010 | DeLine et al. | | |
| 7,861,149 B2 | 12/2010 | Wang et al. | | |
| 8,005,811 B2* | 8/2011 | Berstis | .............. | G06F 17/30864 707/706 |
| 8,190,618 B2* | 5/2012 | Berstis | .............. | G06F 17/30722 707/751 |

(Continued)

OTHER PUBLICATIONS

Chen, Wei et al.; "Extracting Hot Spots of Basic and Complex Topics From Time Stamped Documents"; IEEE; Copyright 2009; pp. 8.

(Continued)

*Primary Examiner* — Cesar B Paula
*Assistant Examiner* — James H. Blackwell
(74) *Attorney, Agent, or Firm* — Robert J. Shatto; Hoffman Warnick LLC

(57) ABSTRACT

A system, method and program product for document navigation by usage location in a document editing application. A document map divides a document into a plurality of document elements and a user interaction dataset records weights and durations of user interactions for each of the document elements over a plurality of user interactions. A usage calculator calculates a usage value for each of the document elements based on weights and duration. The usage value for each of the document elements is used generate an element selection interface to selectively display a relevant document element on a document navigation display.

17 Claims, 4 Drawing Sheets

(56) References Cited

U.S. PATENT DOCUMENTS

| | | | |
|---|---|---|---|
| 8,281,250 B2 | 10/2012 | Carter et al. | |
| 8,321,780 B2 | 11/2012 | Erwig et al. | |
| 8,549,629 B1* | 10/2013 | McCreesh | G06F 21/316 |
| | | | 726/22 |
| 8,949,287 B2 | 2/2015 | Hull et al. | |
| 9,307,051 B2* | 4/2016 | Chung | H04L 67/36 |
| 9,398,071 B1* | 7/2016 | Burciu | H04L 65/1059 |
| 9,438,694 B1* | 9/2016 | Ochesel | H04L 67/42 |
| 9,577,889 B1* | 2/2017 | Dumitrascu | H04L 41/22 |
| 9,753,922 B2* | 9/2017 | Hausler | G06F 17/30011 |
| 2001/0056463 A1* | 12/2001 | Grady | G06F 17/30876 |
| | | | 709/203 |
| 2002/0095443 A1* | 7/2002 | Kovack | G06F 17/2241 |
| | | | 715/205 |
| 2004/0088415 A1* | 5/2004 | Chandrasekar | G06F 12/126 |
| | | | 709/226 |
| 2005/0114510 A1* | 5/2005 | Error | G06Q 30/02 |
| | | | 709/225 |
| 2006/0155782 A1* | 7/2006 | Berstis | G06F 17/30011 |
| 2008/0177623 A1 | 7/2008 | Fritsch et al. | |
| 2008/0228910 A1* | 9/2008 | Petri | G06F 17/30905 |
| | | | 709/224 |
| 2009/0265196 A1* | 10/2009 | Dewar | G06F 9/451 |
| | | | 705/7.11 |
| 2010/0274744 A1* | 10/2010 | Brdiczka | G06Q 10/06 |
| | | | 706/12 |
| 2011/0072370 A1* | 3/2011 | Mitchell | G06F 9/451 |
| | | | 715/762 |
| 2013/0036169 A1* | 2/2013 | Quigley | G06Q 10/00 |
| | | | 709/204 |
| 2013/0080910 A1* | 3/2013 | Bingell | G06F 3/048 |
| | | | 715/744 |
| 2013/0205203 A1 | 8/2013 | MacDougall et al. | |
| 2013/0268880 A1* | 10/2013 | Kasravi | G06F 3/0483 |
| | | | 715/776 |
| 2014/0075018 A1* | 3/2014 | Maycotte | H04L 67/22 |
| | | | 709/224 |
| 2014/0143835 A1* | 5/2014 | Brennan | G06F 17/217 |
| | | | 726/4 |
| 2014/0208231 A1* | 7/2014 | Chung | H04L 67/36 |
| | | | 715/753 |
| 2015/0112677 A1 | 4/2015 | Schubert | |
| 2015/0317757 A1* | 11/2015 | Mihai | G06Q 50/20 |
| | | | 705/326 |
| 2015/0339293 A1* | 11/2015 | Davidse | G06F 17/289 |
| | | | 704/2 |
| 2015/0379244 A1* | 12/2015 | Pathak | G06F 21/10 |
| | | | 726/28 |
| 2016/0034469 A1* | 2/2016 | Livingston | G06F 17/30528 |
| | | | 707/706 |
| 2016/0179808 A1* | 6/2016 | De Napoli Ferreira | G06F 17/3089 |
| | | | 707/725 |
| 2016/0344828 A1* | 11/2016 | Hausler | G06F 17/30011 |
| 2018/0218394 A1* | 8/2018 | Kerns | G06Q 30/0251 |

OTHER PUBLICATIONS

Spring, Michael; "Functional Overview of CASCADE"; Printed Apr. 16, 2016; pp. 9; Jan. 31; EST 1997; <http://www.sis.pitt.edu/spring/cas/node38.html>.

* cited by examiner

NAVIGATION BY USAGE LOCATIONS IN A DOCUMENT EDITING APPLICATION

TECHNICAL FIELD

The disclosure relates to document editing environments, and more particularly to navigation elements for computer-based document editing applications.

BACKGROUND

Most computer users, particularly those who use computers in the work place, frequently use computers to write, edit, and review long documents, such as word processing documents, spreadsheets, presentations, software code, and other documents. Users may use a variety of computer applications for writing and editing documents, such as text editors, word processing applications, and a variety of specialized editor applications for desktop publishing, spreadsheets, presentations, software code, etc.

Over the course of writing, editing, and reviewing large documents, the user may need to navigate to various locations in the document. Navigating documents commonly involves scrolling from a presently displayed portion of the document to an adjacent portion of the document. Many document editing environments may include additional navigation elements, such as page numbers, chapter/section headings/numbers, link locations, tabs, cell identifiers, slides, etc., as well as navigational interface features that enable the user to select a location based on the navigational elements. For example, the user interface of a word processing application may include a page indicator and a field for entering a page to jump to or display a side bar with various location options, such as chapter/section headings, that can be selected to navigate to that position in the document. More dynamic navigation features are also possible, such as keyword navigation (automated or using a "Find" function) or markup navigation (recently edited locations using "Track Changes").

SUMMARY

Aspects of the disclosure provide a system, method and program product for document navigation by usage location in a document editing application. A document map divides a document into a plurality of document elements and a user interaction dataset records weights and durations of user interactions for each of the document elements over a plurality of user interactions. A usage calculator calculates a usage value for each of the document elements based on weights and duration. The usage value for each of the document elements is used generate an element selection interface to selectively display a relevant document element on a document navigation display.

A first aspect discloses a document editing system that includes a document map, a user interaction dataset, and a usage calculator. The document map divides a document into a plurality of document elements. The user interaction dataset records weights of user interactions and durations of user interactions for each of the plurality of document elements over a plurality of user interactions. The usage calculator uses the user interaction dataset to calculate a usage value for each of the plurality of document elements based on weights of user interactions and durations of user interactions recorded over the plurality of user interaction. A computer system providing a document navigation interface, wherein the usage value for each of the plurality of document elements is used to generate an element selection interface to selectively display a relevant document element on the document navigation display.

A second aspect discloses a computer program product stored on a computer readable storage medium, which when executed by a computing system, provides a document editing system. Program code accesses a document map that divides a document into a plurality of document elements. Program code accesses a user interaction dataset that records weights of user interactions and durations of user interactions for each of the plurality of document elements over a plurality of user interactions. Program code uses the user interaction dataset to calculate a usage value for each of the plurality of document elements based on weights of user interactions and durations of user interactions recorded over the plurality of user interaction. Program code provides a document navigation interface, wherein the usage value for each of the plurality of document elements is used generate an element selection interface to selectively display a relevant document element on the document navigation display.

A third aspect discloses a computerized method. A document map is accessed that divides a document into a plurality of document elements. A user interaction dataset is accessed that records weights of user interactions and durations of user interactions for each of the plurality of document elements over a plurality of user interactions. A usage value is calculates for each of the plurality of document elements based on weights of user interactions and durations of user interactions recorded over the plurality of user interaction using the user interaction dataset. The document is navigated through a document navigation interface on a computer system, wherein the usage value for each of the plurality of document elements is used generate an element selection interface to selectively display a relevant document element on the document navigation display.

BRIEF DESCRIPTION OF THE DRAWINGS

These and other features of this invention will be more readily understood from the following detailed description of the various aspects of the invention taken in conjunction with the accompanying drawings in which.

Figure 1:
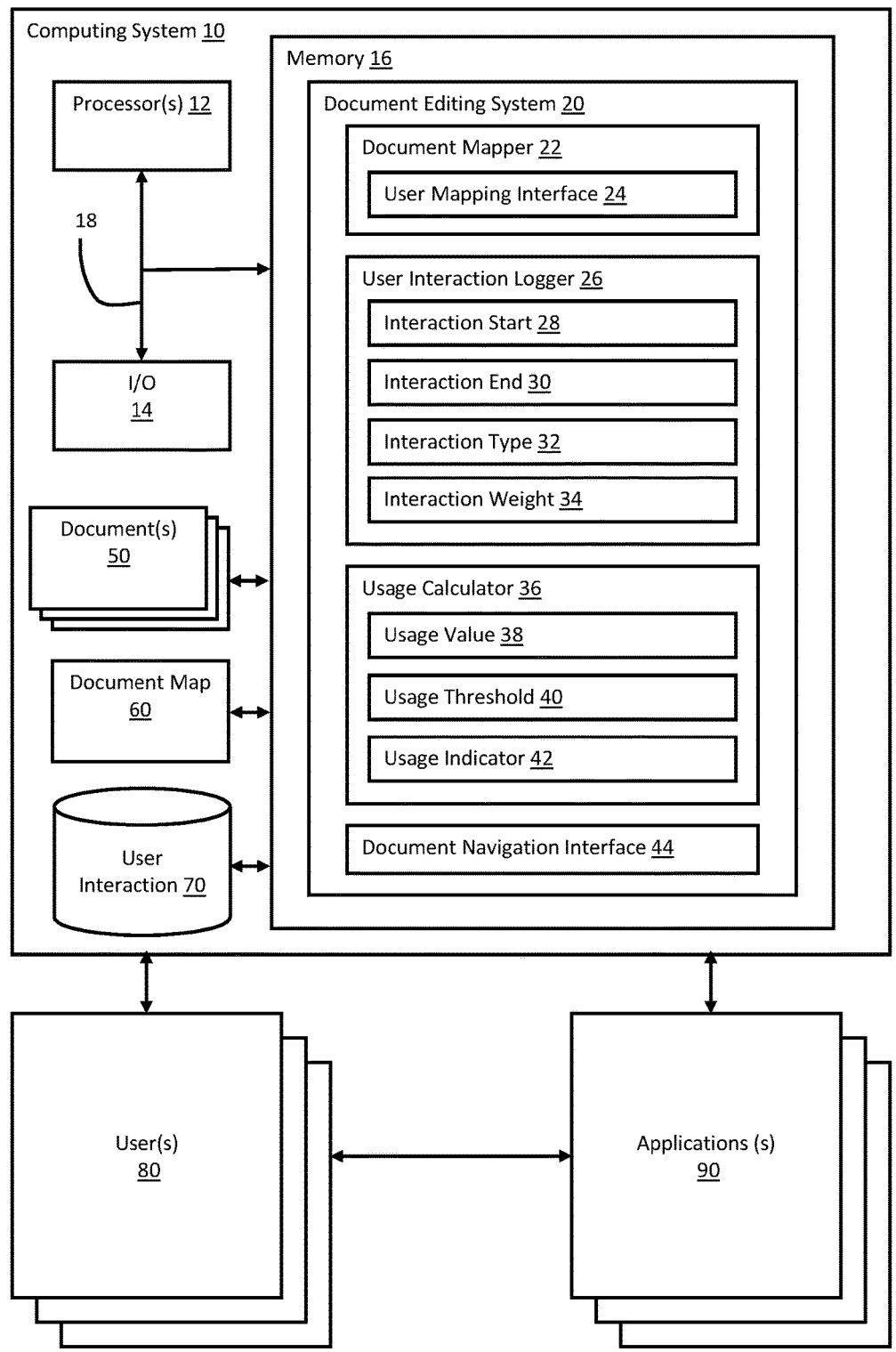
FIG. 1 shows an example document editing system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a document editing system 20 supporting at least one user 80 and at least one document editing application 90. Users 80 may include users of document editing applications in a variety of contexts, such as home, school, work, and mobile use. Document editing applications 90 may include any applications for creating, editing, and reviewing long documents, such as word processing documents, spreadsheets, presentations, software code, and other documents of substantial length and complexity that may gain advantage from improved navigation. Document editing applications 90 may include documents with paginated, linear, scaled (zoom), and/or 2, 3, or n dimensional organization that requires a user to view only a portion of the document through the available document navigation interface at any given time. For example, document editing applications may include text editors, word processing applications, and a variety of specialized editor applications for desktop publishing, spreadsheets, presentations, software code, computer aided design, etc. Other types of documents and related document editing applications may also be possible. Many document editing applications 90 that may be operable with some embodiments of the invention may have predefined document navigation interfaces with a variety of document navigation options, including the use of various pages, indexes, chapter/sections/headings, links (automated or user defined), markup/comments, search, and scaling and scrolling in various directions. In some embodiments, document editing system 20 may take advantage the predefined navigation interfaces to provide usage location navigation based on adding usage locations to indexes, links, search, or other navigational paradigms.

Document editing system 20 may be an application, feature, or subsystem running on computer system 10. Document editing system 20 may have a primary function of creating, editing, and reviewing documents and may include myriad features for enabling those tasks, including various document navigational features. Those common functions and features are well-known in the art and need not be described in detail herein. Document editing system 20, as shown, provides details specifically related to some example embodiments for navigation by usage locations. In some embodiments, document editing system 20 provides a document editing interface for a plurality of compatible documents 50. As shown, documents 50 may be hosted on computer system 10 in a file format compatible with document editing system 20. In some embodiments, document editing system 20 may access one or more remote data sources for accessing document files or data, such as over a network and/or using internet protocols.

Document editing system 20 includes a document mapper 22. Document mapper 22 provides one or more organizational structures for any given document. More specifically, document mapper 22 may divide the document into a plurality of document elements that combine to form the complete document. The exact nature of the document elements may vary among different document types, document styles, and user preferences for organizing their documents. Document elements and their relationships among each other may be understood to define the location of user interactions with a given document. These document elements may include various, hierarchical, and/or overlapping organizational schemes within a single document. For example, a word processing document may include various types and levels of document elements, from pages, sections, and chapters, to paragraphs, sentences, and words, to tables, lists, images, and graphical elements. Many document editing applications, document file formats, and markup languages support the automated identification and organization of document elements. Documents, metadata, or features of the document editing applications may include a document map 60 that identifies one or more structures of document elements that describe the contents of the document. For example, document map 60 may correlate to an outline view of a word processing document with various levels of titles, subtitles, and headings. As another example, document map 60 for a spreadsheet document may include sheets, column/row headings, and cell ranges with common formatting. As still another, document map for a presentation application may include slides, notes, handouts, and slides grouped in sections. In some embodiments, document mapper 22 may access preexisting document mapping topologies embedded in document editing applications 90 or documents 50. In some embodiments, document mapper 22 may include its own topology of document elements that are applied to documents accessed through document editing system 20. In some embodiments, document mapper 22 may provide a user mapping interface 24 to enable the user to create, identify, or select the document element topology to use and/or may enable the user to define custom document elements for use by document editing system 20. In one embodiment, the document elements used in document map 60 are selected from sentences, paragraphs, sections, headings, tables, lists, figures, images, data cells, input fields, formulas, subroutines, comments, drawing elements, or markup.

Document editing system 20 includes a user interaction logger 26. User interaction logger 26 may monitor, measure, record, and classify user interactions with each document element in document map 60 as users 80 interact with any given document. For example, user interaction logger 26 may track and log editing statistics for each portion of the document corresponding to one or more document elements, such as time spent viewing, pointing (or clicking), editing, or commenting on a particular document element. In some embodiments, user interaction logger 26 monitors for specific user actions related to document viewing and editing and defines and characterizes those user actions as user interaction events for tracking usage. User interaction logger 26 may record or log user interaction events in one or more user interaction datasets 70. For example, user interaction datasets 70 may include a database or other data structure for organizing user interaction event variables according to one or more document elements to which they relate.

In some embodiments, user interaction logger 26 may record an interaction start 28 and an interaction end 30. By recording interaction start 28 and interaction end 30, event duration may be calculated. For example interaction end 30 minus interaction start 28 provides an event duration value. In addition, interaction end 30 (or interaction start 28) may be used to locate the event within a stream of user actions to assist in calculating overlapping events and provide time-based decay of aging events to highlight recency in usage metrics. Thus, each user interaction event for a given document element may be represented as a time interval $[a_1;b_1]$ and the stream of interactions with that element may be represented as a series of ordered pairs $[a_1;b_1], \ldots [a_n;b_n]$ during a given time window $[t_1;t_2]$. Duration for any give event is therefore $d_i = b_i - a_i$.

User interaction logger 26 may also include interaction type 32. Interaction type 32 may be a framework for classifying a plurality of user interactions relevant to editing or otherwise interacting with a particular type of document. An example framework for interaction type 32 may be: viewing (document element displayed to a user through an interface), pointing (the user has clicked or otherwise selected a location within or including the document element), and editing (the user has modified the content of the document element using the document editing application). This is a very simple framework for exemplary purposes only. More complex and various user interactions may be used for classifying interaction type 32. User interaction logger 26 may also include an interaction weight 34. Interaction weight 34 provides a numeric correlation to the relative importance of the various interaction types 32 that may be used in calculating and ranking or organizing usage. For example, the example interaction type 32 framework may correlate to an interaction weight model such as: viewing has a weight value of 1 (low), pointing has a weight value of 2 (medium), and editing has a weight value of 3 (high). As with the interaction type example, this is a simplified weighting scheme and more complex and nuanced weighting schemes are possible to more accurately reflect the importance of various types of user interactions. Weighting values need not be linear, exclusive, or constants and may be calculated from more complex interactions or formulas. In some embodiments, one or more users may be provided with an interface for defining the interaction weights they wish to use for measuring and ranking usage of the various document elements.

Document editing system 20 also includes a usage calculator 36. Usage calculator 36 may calculate a usage value 38 for each document element. In some embodiments, usage calculator 36 may be triggered each time user interaction event ends. For example, the most recent interaction event may be used to recalculate the usage value 38 for the relevant document element or elements. In some embodiments, usage calculator 36 may recalculate usage value 38 for all (non-zero) document elements, particularly where the usage value 38 includes time-based decay, relative terms among user interaction events, or other dependencies that may change due to the most recent interaction. A variety of methods or functions may be used to calculate usage value, a measure of the relevance of the document element to enable comparison across document elements. A simple example method is a summation of the interaction duration multiplied by the interaction weight for each interaction for a particular document element. One variation on this simple method is to add a moving time window that excludes prior interactions over a certain age. For example, the summation may include only those interactions occurring in the last 24 hours, 3 days, week, month, etc. In some embodiments, the length of this window is selectable by the user. Another example method to introduce time dependency to usage value calculation, is the use of a non-decreasing function of time to express that recent time intervals are more important than older ones, but without the arbitrary cut-off window. Thus, the values being summed are the weight multiplied by an integration from the interaction start to the interaction end of a given function of time f(t)dt, such as a linear function from 0 to 1 over the total time interval of interest. A variation of this function may be f(t)=(t−start of interval)^n/(end of interval−start of interval)^n, where n>1 results in a convex increasing function and 0<n<1 results in a concave increasing function. Another example would be the use of a function that varies exponentially between 0 and 1 over the time interval, such as f(t)=exp (t-start of interval)/(exp (end of interval minus start of interval)−1). These functions are provided by example only and far more complex relationships may be selected or defined from data theory, such as the use of navigational graphs. The PageRank function in graph theory may provide an example. In some embodiments, the calculated usage values for each document element may be stored in the user interaction dataset 70 for future use, including the basis of future calculations of usage value 38, usage threshold 40, and usage indicator 42.

Usage calculator 36 may also include a usage threshold 40 and a usage indicator 42. Usage threshold 40 may be used to determine the minimum value of usage value 38 for any given document element for it to be deemed relevant or considered at "hot spot." For example, only document elements with a usage value 38 greater than usage threshold 40 will be indicated, displayed, or otherwise treated as relevant. Usage threshold 40 may be a constant, a variable, or a function, such as a mean, median, or other statistical function of usage values. In some embodiments, the user may be provided with an interface to input or select usage threshold 40. In some embodiments, usage threshold 40 may be defined by arranging usage values in an ordered list from highest to lowest and setting the threshold based on the nth position in the list, for example, usage threshold 40 equals the value of the tenth usage value (providing a top ten list). Usage indicator 42 may be a function for recording, navigating, and displaying the relevant document elements. In some embodiments, usage indicator 42 may be a hidden marker embedded in the document (markup, codes, etc.) denoting the relevant document elements (and potentially indicating their usage value, usage rank relative to other usage values, or other information). For example, header information for each section, heading, or similar document element may optionally include an expression for denoting usage. In some embodiments, usage indicator 42 will be embedded in metadata associated with the document, document element, and/or document editing application. For example, the metadata may maintain a list of document elements with usage values exceeding one or more usage thresholds. In some embodiments, usage indicator 42 may be one or more memory elements stored in a document file or related metadata that transforms the way the document is stored, navigated, and edited in memory 16. Usage indicator 42 may include data elements, such as usage value 38 and usage threshold 40. Usage indicator 42 may be used by document editing system 20 to enable improved navigation of documents 50 through document navigation interface 44.

Document editing system 20 includes a document navigation interface 44 for allowing user(s) 80 to navigate document(s) 50 to support document application(s) 90. In some embodiments, document navigation interface 44 is a conventional document editing application interface, such as a word processor, desktop publishing, spreadsheet, or presentation application. Document navigation through document navigation interface 44 may generate the user interactions that are being logged by user interaction logger 26. In some embodiments, document navigation interface 44 may use existing paradigms for document navigation, with the added context of usage values. For example, embedded usage indicators may be displayed with a visual or auditory marker based on a user toggle to selectively display usage indicator 42. As another example, document navigation interface 44 may provide an outline, document map, or menu option for displaying the relevant document elements in isolation or within the context of existing displays of document maps, metadata, and the like. These lists may include links for moving directly from the list to the document element of interest. Document navigation may be a fundamental part of any document editing system and improvement of document navigation through additional vectors (usage) has the technical effect of improving user efficiency and increasing edit rates.

Figure 2:
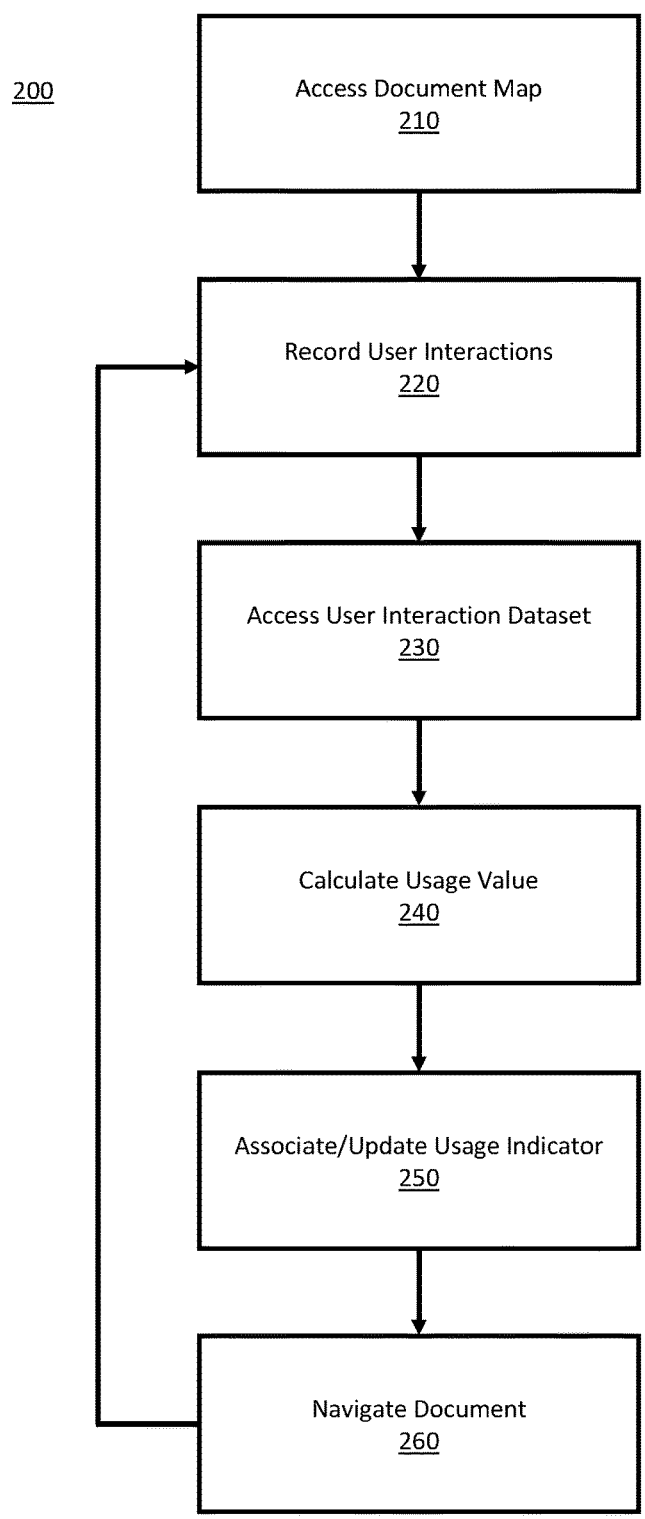
FIG. 2 shows an example method of navigating a document based on usage locations according to embodiments.

FIG. 2 depicts an example method 200 of navigating a document based on usage locations using a document editing system, such as document editing system 20 in FIG. 1. Method 200 may be executed in the context of a document editing application running on a computer system providing a user interface to the document being edited. In step 210, a document map is accessed to define the document elements to be tracked and used as locations of user interaction. For example, the document editing system may include metadata or embedded fields that define document elements as appropriate to the type of document and/or user preferences. In some embodiments, the document editing system may include multiple and potentially overlapping document elements organized as one or more document maps and the user may select which document map, portion of the document map, or specific document elements or document element classes to use for usage tracking. In step 220, user interactions with the document through the document editing system are recorded for use in calculating usage. For example, each user interaction with the document may be treated as a user interaction event by a user interaction logger and stored to a user interaction dataset to describe each user interaction, such as start time, end time, and type of interaction. In step 230, the user interaction dataset is accessed to retrieve the interaction history for each document element. For example, the conclusion of a recent user interaction event may trigger the retrieval of interaction data related to the same document element for a time window of interest such that this data is available to a usage calculator. In step 240, a usage value is calculated or recalculated from the user interaction dataset. For example, the series of interaction data related to the recently interacted with document element may be used to calculate and updated usage value for the document element and may trigger updating of the usage values for other document elements as well. In step 250, a usage indicator is updated or associated with a document element based on changes in one or more usage values. For example, the calculated or recalculated usage value for the document element may be compared against a usage threshold value and, if its status relative to the threshold value has changed, the usage indicator is updated as a hidden field or metadata. In the event that there was not a preexisting usage indicator for the document element, a new usage indicator may be associated with the document element. In step 260, the document is navigated based upon the usage indicators. For example, the document editing system may provide various navigation options, such as providing a menu, sidebar, linked/annotated document map, next/previous, or similar navigation for usage-based "hot spots" during future editing sessions. Any such future editing sessions may return to step 220 for recording the next user interaction and following the remaining steps for updating the usage values and indicators.

Figure 3:
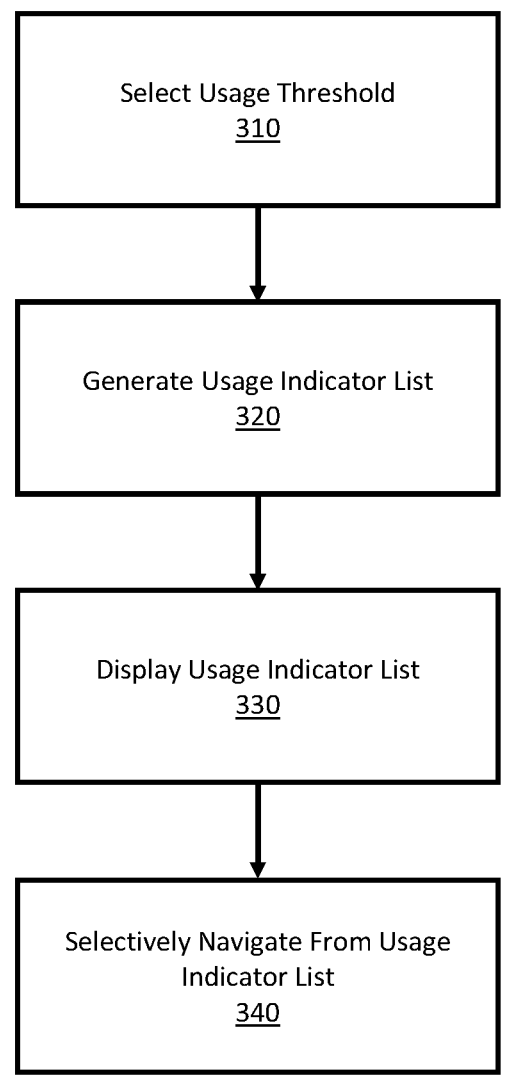
FIG. 3 shows an example method of navigating a document using a usage indicator list according to embodiments.

FIG. 3 depicts an example method 300 of navigating a document using a usage indicator list. In some embodiments, a usage indicator list may be used to support one or more document navigation features in a document editing application. Method 300 may be used in conjunction with a document editing system, such as document editing system 20 in FIG. 1. In step 310, a usage threshold is selected. For example, a usage threshold may be a constant maintained by the system, a variable calculated by statistical analysis of usage values within a document or population of documents, determined based on displaying a selected number of high usage areas, or set be a user (including user input into one of the prior listed approaches). In step 320, a usage indicator list is generated based on the selected usage threshold. For example, once a usage threshold is set, the calculated usage values for each document element may be compared against the usage threshold to identify those document elements to be treated as high usage and appended to a list of usage indicators. In step 330, the usage indicator list is displayed to a user with one or more options for navigating the document using the usage indicator list. For example, the usage indicator list may be displayed in descending usage value order in a side bar or popover window within the document editing application. In step 340, the user selectively navigates the document based on selecting a document element from the displayed usage indicator list.

Figure 4:
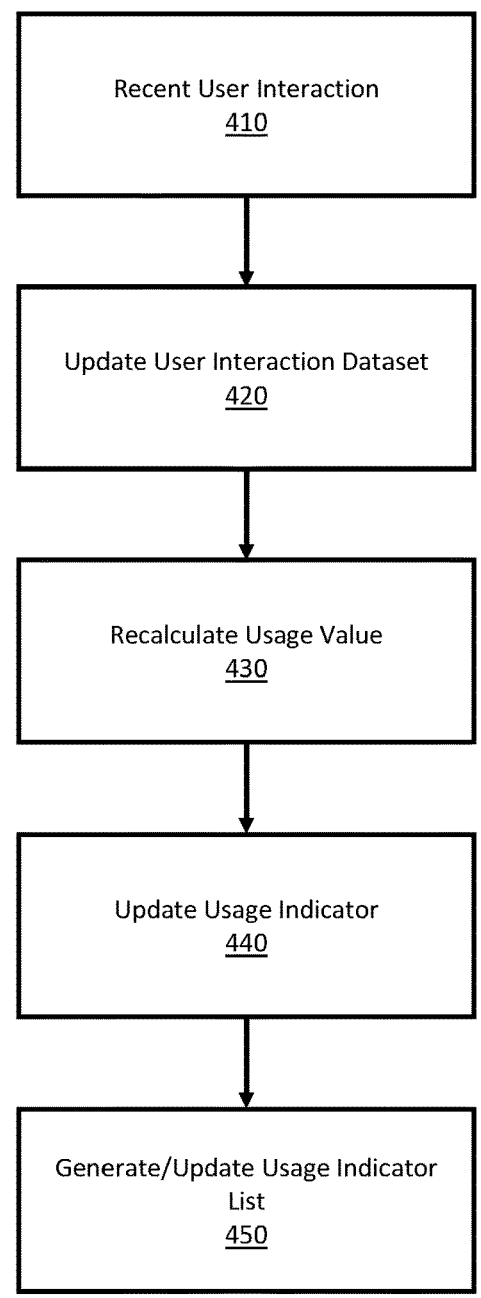
FIG. 4 shows an example method of updating usage indicators according to embodiments.

FIG. 4 depicts an example method 400 of updating usage indicators based on a recent user interaction. Method 400 may be used in conjunction with a document editing system, such as document editing system 20 in FIG. 1. In step 410, a recent user interaction is completed. For example, the user concludes an editing session or navigates to another document element. In step 420, the user interaction dataset is updated to reflect the recent user interaction. For example, the start time, end time, and type of the user interaction may be written into the data structure for the relevant document element in the user interaction dataset. In step 430, the usage value for at least the relevant document element is recalculated based on the changes in the user interaction dataset. For example, a new term for the weight and duration of the most recent user interaction may be calculated and summed with the prior interactions in a time window of interest for calculating usage. In some embodiments, usage values may be recalculated for other document elements as well. In step 440, the usage indicator for the document element is updated to reflect any change in value, rank, or comparison against a usage threshold. For example, the usage indicator may include both a value and rank for the usage of the document element and the value and rank may be changed to reflect the increase in usage and ascension in the rankings. In step 450, the usage indicator list is generated or updated. For example, a usage indicator list may maintain the top ten most used document elements for the user in rank order and the usage indicator list may be updated for the change in rank position for display to the user and use for navigation.

It is understood that document editing system 20 may be implemented as a computer program product stored on a computer readable storage medium.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 may comprise any type of computing device and for example includes at least one processor 12, memory 16, an input/output (I/O) 14 (e.g., one or more I/O interfaces and/or devices), and a communications pathway 18. In general, processor(s) 12 execute program code which is at least partially fixed in memory 16. While executing program code, processor(s) 12 can process data, which can result in reading and/or writing transformed data from/to memory and/or I/O 14 for further processing. The pathway 18 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the document editing system 20 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A document editing system, comprising:
   a document map that divides a document into a plurality of document elements;
   a user interaction dataset that records weights of user interactions and durations of user interactions for each of the plurality of document elements over a plurality of user interactions;
   a usage calculator that uses the user interaction dataset to calculate a usage value for each of the plurality of document elements based on weights of user interactions and durations of user interactions recorded over the plurality of user interactions, wherein the usage value for each of the plurality of document elements is equal to a summation of: the weight of each user interaction multiplied by an integration of a function of time f(t)dt from a start of an interval of the user interaction to an end of the interval of the user interaction, wherein f(t)=exp (t−start of interval)/(exp (end of interval minus start of interval)−1); and,
   a computer system providing a document navigation interface, wherein the usage value for each of the plurality of document elements is used generate an element selection interface to selectively display a relevant document element on the document navigation display.

2. The document editing system of claim 1, further comprising a user interaction logger that tracks a plurality of user interaction types through the document navigation interface and records weights and durations for the plurality of user interactions in the user interaction dataset.

3. The document editing system of claim 2, wherein the user interaction dataset includes a plurality of editing statistics corresponding to the plurality of user interaction types gathered by the user interaction logger and the plurality of user interaction types are selected from the group of document element display, document element pointing, document element editing, or document element commenting, and the weights of user interactions are based on the user interaction type.

4. The document editing system of claim 1, wherein the plurality of document elements are selected from sentences, paragraphs, sections, headings, tables, lists, figures, images, data cells, input fields, formulas, subroutines, comments, drawing elements, or markup.

5. The document editing system of claim 1, wherein the usage calculator recalculates the usage value of a most recent document element from the plurality of document elements after each user interaction with the most recent document element.

6. The document editing system of claim 1, further comprising a usage threshold, wherein the usage threshold is compared to the usage value for the plurality of document elements and a usage indicator is associated with at least one of the plurality of document elements based on the comparison of the usage threshold to the usage value.

7. A computer program product stored on a computer readable storage medium, which when executed by a computing system, provides a document editing system, the program product comprising:
   program code that accesses a document map that divides a document into a plurality of document elements;
   program code that accesses a user interaction dataset that records weights of user interactions and durations of user interactions for each of the plurality of document elements over a plurality of user interactions;
   program code that uses the user interaction dataset to calculate a usage value for each of the plurality of document elements based on weights of user interactions and durations of user interactions recorded over the plurality of user interactions, wherein the usage value for each of the plurality of document elements is equal to a summation of: the weight of each user interaction multiplied by an integration of a function of time f(t)dt from a start of an interval of the user interaction to an end of the interval of the user interaction, wherein f(t)=exp (t−start of interval)/(exp (end of interval−start of interval)−1);
   and
   program code that provides a document navigation interface, wherein the usage value for each of the plurality of document elements is used generate an element selection interface to selectively display a relevant document element on the document navigation display.

8. The computer program product of claim 7, further comprising program code that tracks a plurality of user interaction types through the document navigation interface and records weights and durations for the plurality of user interactions in the user interaction dataset.

9. The computer program product of claim 8, wherein the user interaction dataset includes a plurality of editing statistics corresponding to the plurality of user interaction types and the plurality of user interaction types are selected from the group of document element display, document element pointing, document element editing, or document element commenting, and the weights of user interactions are based on the user interaction type.

10. The computer program product of claim 7, wherein the plurality of document elements are selected from sentences, paragraphs, sections, headings, tables, lists, figures, images, data cells, input fields, formulas, subroutines, comments, drawing elements, or markup.

11. The computer program product of claim 7, wherein the usage value of a most recent document element from the plurality of document elements is recalculated after each user interaction with the most recent document element.

12. The computer program product of claim 7, further comprising a usage threshold, wherein the usage threshold is compared to the usage value for the plurality of document elements and a usage indicator is associated with at least one of the plurality of document elements based on the comparison of the usage threshold to the usage value.

13. A computerized method comprising:
   accessing a document map that divides a document into a plurality of document elements;
   accessing a user interaction dataset that records weights of user interactions and durations of user interactions for each of the plurality of document elements over a plurality of user interactions;
   calculating a usage value for each of the plurality of document elements based on weights of user interactions and durations of user interactions recorded over the plurality of user interactions using the user interaction dataset wherein the usage value for each of the plurality of document elements is equal to a summation of: the weight of each user interaction multiplied by an integration of a function of time f(t)dt from a start of an interval of the user interaction to an end of the interval of the user interaction, wherein f(t)=exp (t−start of interval)/(exp (end of interval−start of interval)−1); and navigating the document through a document navigation interface on a computer system, wherein the usage value for each of the plurality of document elements is used generate an element selection interface to selectively display a relevant document element on the document navigation display.

14. The computerized method of claim 13, further comprising tracking a plurality of user interaction types through the document navigation interface and recording weights and durations for the plurality of user interactions in the user interaction dataset.

15. The computerized method of claim 14, wherein the user interaction dataset includes a plurality of editing statistics corresponding to the plurality of user interaction types and the plurality of user interaction types are selected from the group of document element display, document element pointing, document element editing, or document element commenting, and the weights of user interactions are based on the user interaction types.

16. The computerized method of claim 13, wherein the usage value of a most recent document element from the plurality of document elements is recalculated after each user interaction with the most recent document element.

17. The computerized method of claim 13, further comprising comparing a usage threshold to the usage value for the plurality of document elements and associating a usage indicator with at least one of the plurality of document elements based on the comparison of the usage threshold to the usage value.

* * * * *